United States Patent
Reinosa

(10) Patent No.: US 6,349,693 B1
(45) Date of Patent: Feb. 26, 2002

(54) METHOD AND BYPASS FILTER APPARATUS FOR AN INTERNAL COMBUSTION ENGINE

(76) Inventor: Adan Reinosa, 1729 Westmoreland Dr., Montebello, CA (US) 90604

( * ) Notice: Subject to any disclaimer, the term of this patent is extended or adjusted under 35 U.S.C. 154(b) by 0 days.

(21) Appl. No.: 09/517,158

(22) Filed: Feb. 28, 2000

(51) Int. Cl.$^7$ .............................................. B01D 35/06
(52) U.S. Cl. ................................ 123/196 A; 123/196 R
(58) Field of Search ........................ 123/196 R, 196 A, 123/196 S

(56) References Cited

U.S. PATENT DOCUMENTS

| | | | | |
|---|---|---|---|---|
| 4,561,395 A | * | 12/1985 | McMullen | 123/196 A |
| 4,689,144 A | * | 8/1987 | Holmes | 123/196 A |
| 4,839,041 A | * | 6/1989 | Kuwayama et al. | 123/196 A |
| 5,743,231 A | * | 4/1998 | Reinosa | 123/196 S |
| 5,814,211 A | * | 9/1998 | Leo | 123/196 A |

* cited by examiner

*Primary Examiner*—Marguerite McMahon
*Assistant Examiner*—Benton Jason

(57) ABSTRACT

In an automobile, the apparatus is interposed between the normally provided spin on oil filter and its point of attachment to the engine block. The device is similar in size and shape to a flat cylinder, possessing an internal chamber filled with numerous discrete magnets, a ring magnet with multiple poles, a magnetic grid or sponge, or other filter media. The cylinder is designed with a number of radially disposed holes which allow the pressurized lubricant fluid coming from the normally provided engine oil pump to pass through the puck and into the spin on filter and into the engine. This is the main flow. The radially disposed holes collectively act as an orifice restriction to the flow of oil. A method is suggested to achieve pressure differential between the two sides of the cylinder due to the orifice restriction. A sealed hollow chamber or duct is provided inside the cylinder. Multiple magnets, or other filter media, are placed inside the sealed chamber. Next, diametrically opposed sets of control orifices, carefully sized with predetermined numbers and diameters, are made on the engine side and on the filter side. The orifices in the upstream side and on the downstream side, effectively become the intake and exhaust of a self-contained magnetic bypass filter respectively. The puck is easily secured by means of a threaded nipple. A set of fins is placed around the cylinder to include the additional function of bypass flow cooling.

12 Claims, 3 Drawing Sheets

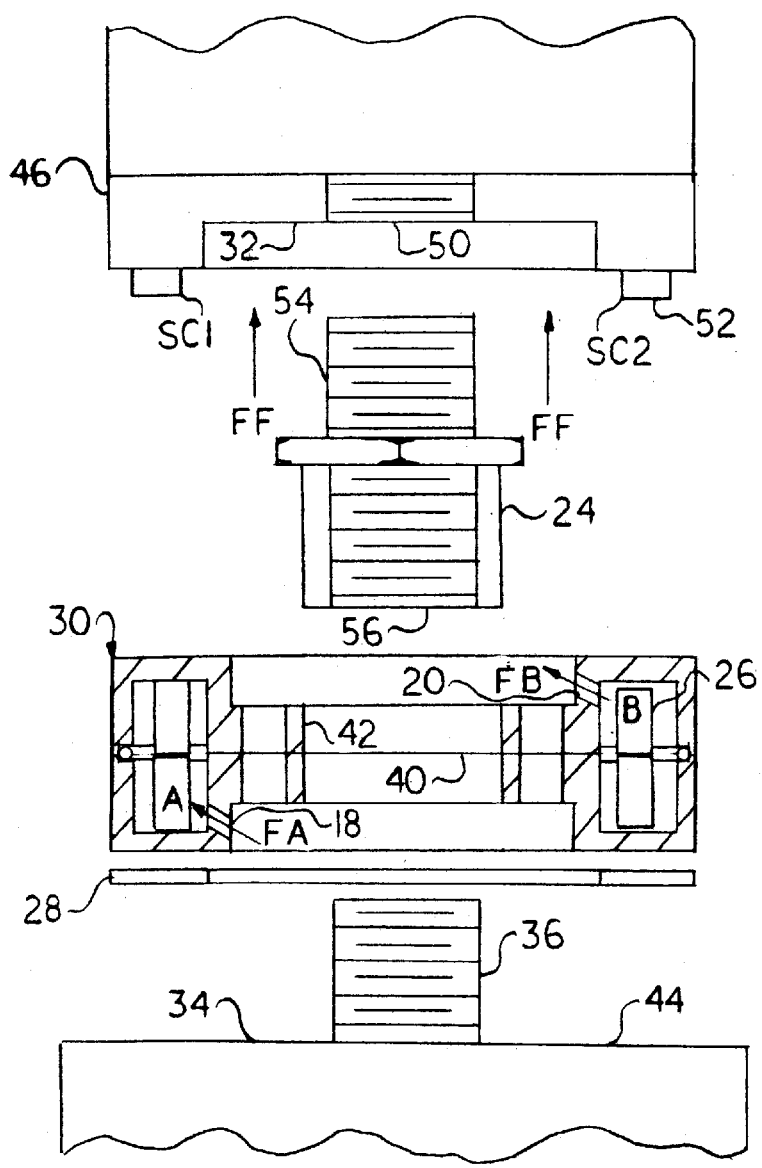
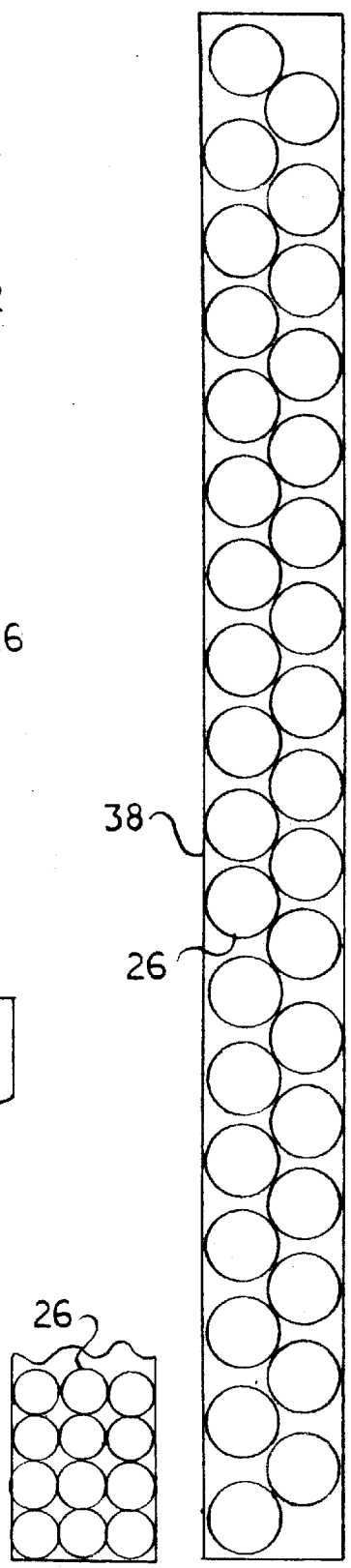
FIG.3
FIG.4

METHOD AND BYPASS FILTER APPARATUS FOR AN INTERNAL COMBUSTION ENGINE

FIELD OF THE INVENTION

This invention pertains to the art of methods and apparatuses for filtering particles from a fluid, and more specifically to methods and apparatuses for oil filter enhancements and for filtering magnetically attractable particles and other suspended particles in an engine lubricant using magnets or other filter media.

BACKGROUND OF THE INVENTION

Much of the fine abrasive particles produced inside an internal combustion engine at the site of friction is carried immediately away by the flow of lubricating fluid. A major part of an engine wear is due to the destructive nature of small ferrous abrasive particles being recycled continuously to the friction bearing surfaces by the engine's lubrication system. This is due to the limited ability of the normally provided oil filter medium to arrest such abrasive particles. By design, the filter has to allow for a relatively unrestricted normal oil flow, this can only happen with relatively large pore sizes. Most filter media are designed to stop particles of about 20 microns cross-sectional dimension. A lot of magnetic particles in the range of sub-micronic to 20 microns cross-sectional dimension are produced and generally not arrested by the media, or even dangerously bypassed during cold engine starts and/or partially clogged and saturated filter media conditions. Therefore, if these particles are not removed, they continue to produce ever more metal shavings in an increasing and uncontrolled avalanche effect that may lead, according to many experts, to substantial engine wear. To further complicate this scenario, current engines and like machinery are designed with tighter tolerances, higher running temperatures, continuously increasing performance demands, extended service intervals, longer powertrain warranties, and more stringent smog specifications. This wear scenario eventually results in a degradation of close tolerances at critical locations between rotating parts, causing a loss of performance, more frequent maintenance repairs, and eventually catastrophic engine failure. It is therefore of great interest that a convenient, non-intrusive method and apparatus be introduced to address at least one of the major causes of engine performance decay, premature engine wear, and premature disposal of the lubricating oil.

Attempts to enhance the filtration capabilities of filters have been tried by means of creating a magnetic field in order to attract magnetic particles to the internal wall of the common disposable spin on filter. This is generally attempted by placing magnets in different arrangements around the outside surface of a spin on filter. However these previous known structures provide limited, incomplete, weak, statistically insignificant, expensive, hard to remove, bulky, and generally their effectiveness is limited to very small areas of the canister filter inside wall. Even with the approach of U.S. Pat. No. 5,647,993 issued to Karp, suggesting a helical arrangement to capture the magnetic field around the outside wall of the filter, the net effect on the internal wall of the filter becomes negligible to effectively arrest magnetic particles. When fast lubricant flow, turbulence, magnetic particle cluster separation, low statistical contact of same volume in proximity to weakly magnetized areas are considered, this approach sounds effective but the results have proven generally unsatisfactory.

The art of placing magnets on the external wall of a filter is inherently flawed for two mutually exclusive reasons: weak magnets can only exert weak attractive fields on the internal surface of the spin-on filter, and are therefore largely ineffective to attract and retain magnetic particles. This is due to fluid turbulence, weak magnetic influence, fast flow, localized eddy currents, magnetic leakage, and limited enhanced area. On the other hand, as magnet size, number, and strength increases, other problems arise such as more expensive, bulky, and hard to remove.

Other problems involve the choice of materials to withstand the high temperatures associated with the working lubricant, which may reach up to 300 degrees Farenheit in rare occasions. For example U.S. Pat. No. 5,441,647, issued to Wascher, discusses a material having a higher melting point than the operating fluid, or the similar approach of a suction cup with magnet as shown in U.S. Pat. No. 5,571,411, issued to Butler et al.

Other problems of magnets attached to the canister filter include the difficulty of removal of the magnets, the limited clearance in the radial direction from the canister once the filter is installed, the variability in the canister filter diameter, the discipline required every time to remove and place on the new filter canister. In some cases, as suggested in U.S. Pat. No. 5,282,963, issued to Hull et al., a tool is needed to remove the apparatus. In addition, the use of magnetic material clamps tend to weaken the already weak effect through the canister wall of the magnets it intends to hold. In some vibration environments, the devices may detach themselves, causing immediate possible damage due to sudden cluster separation inside the filter upon loss of retaining magnetic field, resulting in the sudden and concentrated release of all collected particle clusters.

Yet another problem, demonstrating the lack of commercial success of the current art, is the cost and discipline in removing and replacing, which may not justify in terms of quantifiable evidence, the economic benefit of using them. Therefore, any cost and inconvenience factor must be minimized or eliminated to overcome this problem.

In some prior art, such as U.S. Pat. No. 4,450,075 issued to Krow, the magnets are in direct contact with the lubricating fluid. This is an improvement over the magnets attached to the walls, because all the surface area and magnetic strength of the magnets are exposed directly to the fluid. However, placing the magnets in the highly turbulent and fast flow areas of the oil canister center, or other similar locations, pose an additional risk of clogging the flow. In some situations, due to the reduction of flow area, this create areas of higher than normal turbulence and velocity, according to flow and mass continuity theory equations. These conditions result in an even higher risk, not only to counteract the attraction and retention of the particles, but an easier dislodging of already built particulate clusters, if any.

In some situations, a complicated arrangement such as an external bypass oil filter and adapter arrangement may be used to remove magnetic and non-magnetic particulate. These obviously complement the filtering function of the normal full flow filter, but at the expense of high cost and space sacrifice in an already cramped engine bay. In addition, as much as 10% of oil flow may be diverted away from the intended regions for oil protection, and in some high temperature operating cases, this may mean heat stress through oil cooling reduction flow to bearing surfaces. Such a system is shown in U.S. Pat. No. 4,406,784 issued to Cochran, which requires extensive external hardware and installation cost.

Many patents teach different and incomplete ways about the removal of magnetic particles from a fast flowing lubricating fluid, and in some cases from the lubricant at rest, such as in the case of magnetic bolts shown in U.S. Pat. No. 5,465,078 issued to Jones. Approaches to removing magnetic particles from the flow of internal combustion engine lubricant tend to be of the following descriptors: external magnets using the magnetic external wall of the filter, immersed in the path of turbulent and fast oil flow, different means of installing and removing from canister, complicated and expensive to install apparatus, helical configurations for magnetic fields, external by-pass filtration, elaborate and expensive filters, etc. From those descriptors the following US Patents are examples of this prior art: U.S. Pat. Nos. 4,026,805, Fowler; 4,051,036, Conrad et al.; 4,052,312, King; 4,053,409, Kuhfuss; 4,218,320, Liaw; 4,265,748, Villani et al.; 4,406,784, Cochran; 4,446,019, Robinson; 4,450,075, Krow; 4,498,987, Inaba; 4,529,517, Bertil; 4,561,395, McMullen; 4,585,553, Hikosaka et al.; 4,592,836, Chiao; 4,629,558, Garrity; 4,689,144, Holmes; 4,700,670, Schade; 4,705,626, Morelli; 4,763,092, Tomita; 4,826,592, Taylor; 4,894,153, Shirdavant; 4,992.166, Lowsky et al.; 5,000,779, Hebert; 5,039,406, Whittington; 5,078,871, McCready; 5,089,129, Brigman; 5,186,827, Liberti et al.; 5,228,990, Chiang; 5,273,648, Caiozza; 5,282,963, Hull et al.; 5,354,462, Pertt; 5,441,647, Wascher et al.; 5,465,078, Jones; 5,468,381, Williamson; 5,556,540, Brunstig; 5,569,373, Smith et al.; 5,571,411, Butler et al.; 5,634,755, Jones; 5,647,993, Karp; 5,695,637, Jiang et al; 5,702,598, Lemon et al.; 5,817,233, Cooper, 5,830,371, Smith; 5,885,447, Theisen et al., among others.

Although these and other devices have attempted to remove magnetic particles from the engine oil flowing through an engine lubrication circuit, they have collectively failed to address the desired simultaneous effectiveness-cost-convenience conditions.

SUMMARY OF THE INVENTION

In view of the foregoing disadvantages inherent in the known types of magnetic belt apparatus, bypass filtration, internally disposed magnets, and other similar approaches found in the prior art, the present invention provides the very objective of removing and retaining magnetic particles suspended in the working fluid in a conduit, in a novel and most effective manner. As such, the purpose of the present invention, which will be described in greater detail, is to provide an apparatus that delivers the functions seeked by the prior art, but with all the advantages and none of the disadvantages and shortcomings of prior art.

The present invention takes advantage of a combination of factors not suggested by prior art. The present invention does not reside on any of those factors per se, but rather in the suggested combination of them herein disclosed and claimed. In order to remove and retain particles suspended in a moving fluid, the following combined conditions suggest a method and an apparatus:

1. Effect a pressure differential by placing a lubricant flow restriction means in the flow path;
2. provide a means to channel an amount of lubricant fluid through a bypass duct;
3. slow down the bypassed lubricant flow to effect successful and consistent entrapment and retention of the suspended particles;
4. pass the bypass lubricant flow through a filter medium or expose the flow directly to a magnet surface to avoid magnetic leakage and field weakening, thus maximizing magnet utilization, effectiveness, and value;
5. promote turbulence of the bypass flow to enhance particle capture and to minimize particle cluster separation;
6. maximize the poles and magnet surface exposed directly to the bypass lubricant flow to minimize particle cluster separation by maximizing trapped volume capability while minimizing cluster thickness, i.e.: Exposed magnet area (Maximized) X Cluster thickness (Minimized)=Retained cluster volume (Maximized at minimum thickness); maximize magnet poles and area exposed to lubricant flow to maximize cluster retention volume, thereby maximizing or eliminating cleaning maintenance intervals;
7. utilize the relatively abundant clearance provided along the longitudinal axis of present filters as a design advantage;
8. use the diameter commonality of filter base plates as a design advantage to facilitate one-size-fit-all installation, convenience, and lower cost;
9. use symmetry in the design to further lower the number of parts needed and therefore the cost;
10. use known geometry of engine design to produce a product that can be installed in a few minutes without using special tools nor expensive and time consuming engine modifications;
11. utilize the device as a liquid to air cooler with the addition of a set of cooling fins around the filter body to remove heat from the bypass flow;
12. minimize space utilization in an already cramped automotive engine bay by providing a small device.

The present invention solves the problems encountered in prior art with an apparatus that delivers the function of magnetic and other particle removal in a new and novel manner. In an automobile, the device is interposed between the normally provided spin on oil filter and its point of attachment to the engine block. The device is similar in size and shape to a hockey puck, substantially a flat cylinder. It has an internal chamber or duct filled with numerous discrete magnets, a ring magnet with multiple poles, a magnetic grid or sponge, or other filter media. The puck is designed with a number of radially disposed holes which allow the pressurized lubricant fluid coming from the normally provided engine oil pump to pass through the puck and into the filter. This is the main flow. However, the radially disposed holes collectively act as an orifice restriction to the flow of oil.

According to hydraulic principles, a pressure differential is established between the two sides of the puck, due to the presence of the radially disposed orifice restriction. The pressure differential is proportional to the lubricant density, the square of the flow velocity, inversely proportional to the fourth power of the effective ratio of the collective orifice diameter to the effective puck intake and outlet diameters, and inversely proportional to the square of an empirical operator known as the discharge coefficient. This equation and theory is based on Bernoulli's equation and the net result of interest for the present invention is the presence of a pressure differential between the intake and outlet side, or the pump and filter side of the puck. Based on that observation, a sealed hollow chamber or duct is provided inside the puck. Multiple magnets, or other filter media, are placed inside the sealed chamber or duct. Next, diametrically opposed sets of control orifices, carefully sized with predetermined numbers and diameters, are made on the engine side or lubricant flow upstream side, and on the filter side or lubricant flow downstream side. The orifices in the upstream side and on the downstream side, effectively become the intake and exhaust of a self-contained magnetic bypass filter respectively. The puck is easily secured by means of a threaded nipple custom fitted from a few widely used thread sizes. An easily designed one-size-fit-all circular base gasket to seal the pump side of the puck to the engine is also provided.

OBJECTS AND ADVANTAGES

Accordingly, there exists a need for removing magnetic particulate suspended in a fluid, particularly from internal combustion engines in order to reduce engine wear caused by abrasion of recirculating contaminants suspended in the lubricating fluid by using an apparatus which will remove the suspended contaminants, be simpler, less expensive, more space efficient, easily installed and maintained than prior art.

It is therefore, a primary object of the present invention to provide an apparatus that removes contaminants suspended in a lubricating fluid, and more particularly the removal of magnetic particulate from the lubricating fluid, which includes unappreciated advantages and unsuggested design modifications in prior art, that has all the advantages and additional complementary benefits from design advantages and has none of the unrecognized problems and undesirable design shortcomings found in prior art.

A further object of the present invention is to provide a filter apparatus, that slows down the lubricant flow to effect successful, continuous, consistent entrapment and retention of the suspended particles.

An additional object of the present invention is to provide a filter apparatus that exposes the lubricant flow directly to the magnet surface to avoid magnetic leakage and field weakening as is widely practiced in prior art.

Yet another object of the present invention is to provide a filter apparatus that controls the turbulence of the fluid to enhance particle capture and to minimize particle cluster separation.

A further object of the present invention is to provide a filter apparatus that maximizes poles and magnet surface utilization by exposing the surface and poles directly to the lubricant flow in order to minimize particle cluster separation by maximizing trapped volume capability while minimizing cluster thickness.

A still further object of the present invention is to provide a filter apparatus that maximizes magnet area exposed to maximize cluster retention volume, thereby maximizing or eliminating cleaning maintenance intervals.

Yet another object of the present invention is to provide a filter apparatus that utilizes the relatively abundant clearance provided in the longitudinal direction to facilitate installation in a cramped engine bay.

A further object of the present invention is to provide a filter apparatus that uses the dimension commonality of filter base diameters to facilitate a one-size-fit-all installation at lower cost.

A still further object of the present invention is to provide a filter apparatus that uses symmetry and enjoys design advantages to minimize labor and parts.

Yet another object of the present invention is to provide a filter apparatus that uses engine design common geometry to produce a product that can be installed in a few minutes without using special tools nor expensive and time consuming engine modifications.

A further object of the present invention is to provide a filter apparatus that minimizes parts and space utilization in an already cramped engine bay by providing a small single part and location device.

Another object of the present invention is to provide a filter apparatus that uses its own physical attributes to yield the additional function of cooling the filtered flow.

An even further object of the present invention is to provide a filter apparatus that is new and improved which is susceptible to low cost of manufacture with regard to labor and materials, and which accordingly is susceptible to low price to the buying public, thereby making the present invention economically available to the buying public.

In addition to the aforementioned objects the following advantages are found in the present invention over prior art. The present invention:

a. eliminates transferring the device from the used canister to the new canister;

b. eliminates the use of special high melting point material straps;

c. eliminates the risk of accidental detachment in high vibration environments;

d. eliminates magnetic leakage and makes full use of the magnetic field and area;

e. eliminates the need for special tools, skills, and modifications for its installation;

f. eliminates the risk of clogging the lubricant conduits;

g. eliminates the need to accommodate a great number of canister diameters;

h. eliminates special magnet amplification arrangements;

i. eliminates the problems associated with limited radial clearances;

j. eliminates the need of critical space in present cramped engine bays;

k. eliminates complicated and bulky external hardware;

l. eliminates the need to take the bypass lubricant volume from the main flow m. eliminates the need to orient connections to a remote bypass filter n. eliminates the use of metallic straps that short circuit the magnetic field o. eliminates the possibility of magnet vibration shift and the resulting particle cluster separation.

p. eliminates more frequent cleaning by maximizing use of magnetic strength and available magnetic area.

Further objects of the invention will appear as the description proceeds and claims drawn. To the accomplishment of the above and related objects, this invention is embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

The present invention will be more fully understood by reference to the following detailed description thereof when read in conjunction with the attached drawings, in which like reference characters designate the same similar parts throughout the several views, wherein:

FIG. 3 is a schematic side view illustrating the manner of connection of the filter apparatus to an internal combustion engine.

FIG. 4 illustrates one elongated and one partial magnet arrangements to show the magnets inside the internal bypass duct and the effectiveness of the circular packing arrangement.

REFERENCE NUMERALS IN DRAWINGS

Figure 1:
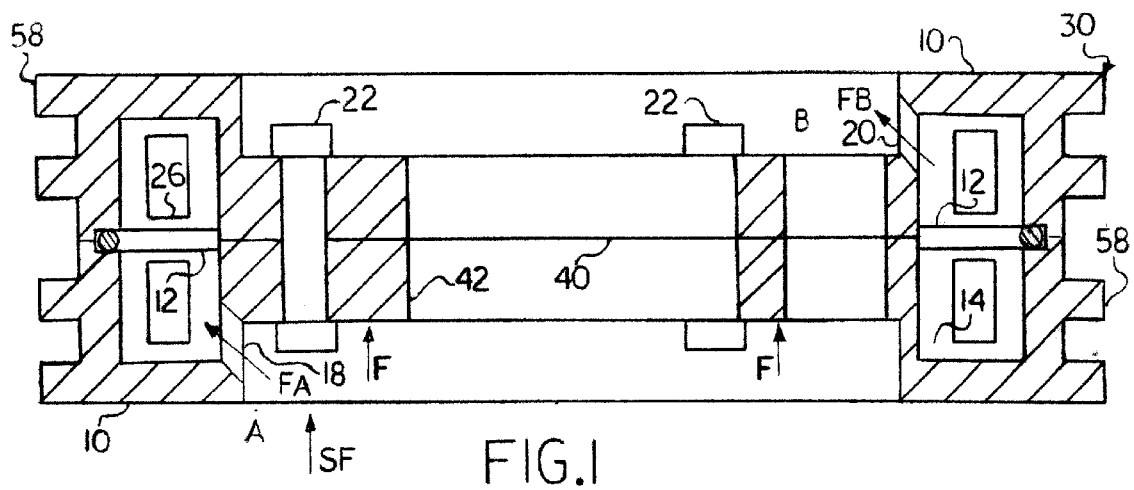
FIG. 1 is a detail side view illustrating a cross sectional view of the assembled structure of the filter apparatus.

10. Filter body symmetrical elements
12. Seal
14. Bypass duct
16. Full flow control orifices
18. By-pass intake control orifice
20. By-pass exhaust control orifice
22. Attachment means
24. Nipple insert
26. Magnets
28. Engine block seal
30. Filter apparatus
32. Oil filter intake plate
34. Engine oil pump pressure outlet
36. Threaded engine oil filter point of attachment
38. Filter apparatus mean effective cross sectional area at 1 5/16" mean radius
40. Mating surface
42. Filter apparatus central passage
44. Engine block
46. Canister oil filter
48. Engine lubricant flow
50. Spin on filter threads
52. Spin on oil filter gasket
54. Insert external threads
56. Insert internal threads
58. Cooling fins

DETAIL DESCRIPTION OF THE DRAWINGS

Referring now to the drawings, FIG. 1 shows a cross sectional view of a bypass filter apparatus 30. The filter apparatus 30 uses a filter symmetrical element 10, in conjunction with another symmetrical element 10, to form the body of the filter apparatus 30. The two symmetrical elements 10, which are exactly the same, are made to mate along a mating surface 40. Still referring to FIG. 1, the two symmetrical elements 10 are kept together by a plurality of attachment means 22, radially disposed around the symmetrical elements 10. The two mated symmetrical elements 10 define a bypass duct 14, which is sealed against leaking pressurized fluid from the inside of bypass duct 14 to the outside by a seal 12, said duct 14 containing a plurality of magnets 26. Filter media could be magnetic, chemical, porous, centrifugal, or other filter media.

Figure 2:
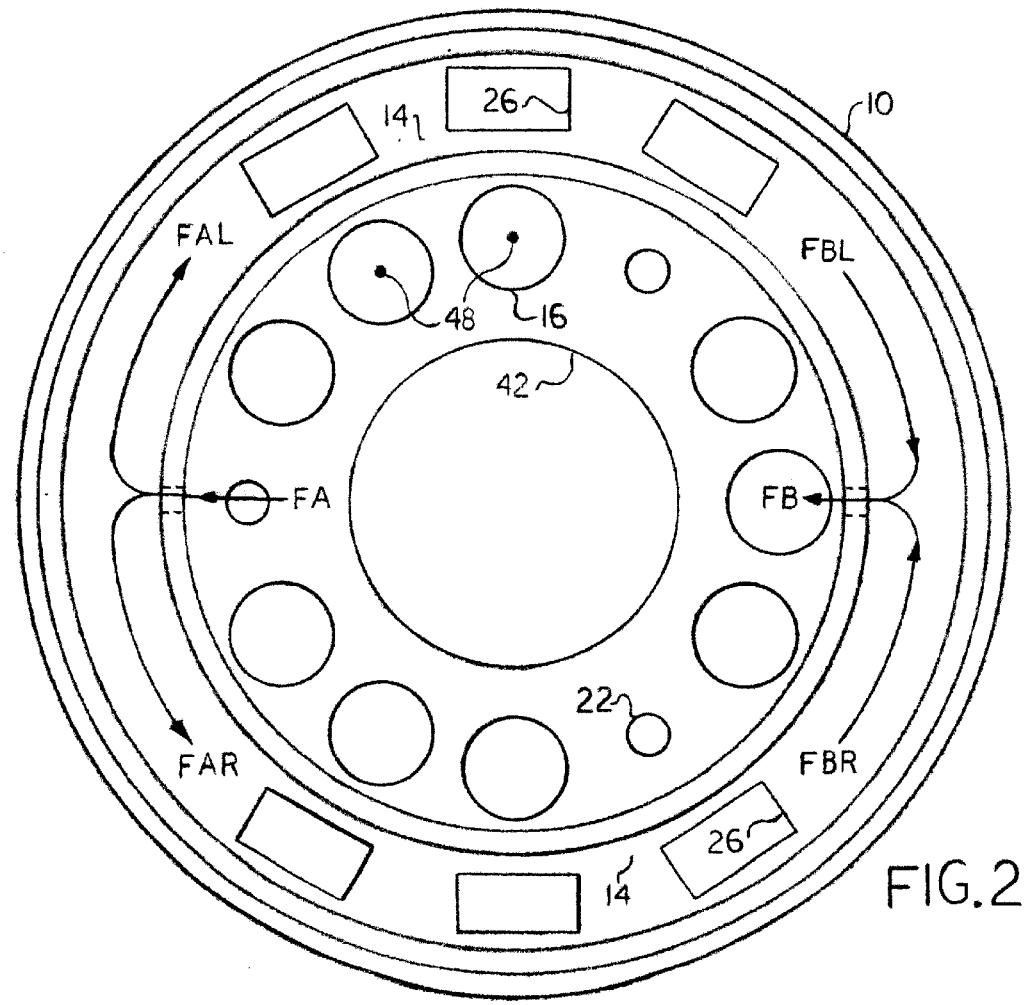
FIG. 2 is a detail top view of the mating surface of the two symmetrical parts that make up the assembled structure of the filter apparatus.

Now referring to FIG. 2, a plurality of predetermined full flow control orifices 16 are radially disposed around the symmetrical elements 10 to offer restriction to an internal combustion engine lubricant flow 48 flowing perpendicular through the control orifices 16. Referring to FIG. 3, a predetermined intake control orifice 18, adjacent to an oil pump pressure outlet 34, or upstream point of the lubricant flow, and a predetermined exhaust control orifice 20, adjacent to an oil filter intake plate 32, or downstream point of the lubricant flow, are substantially diametrically opposed to each other. The orifices 18 and 20 are located at different cross sectional planes, occupying a position A and a position B, respectively. Referring now to FIG. 2, position A and position B are diametrically opposed to each other in order to achieve maximum separation and maximum bypass flow exposure to the plurality of magnets 26 inside bypass duct 14. To slow down a bypass intake flow FA is divided into at least two streams inside bypass duct 14.

Now referring to FIG. 1 and FIG. 2, intake flow FA is divided, and slowed down, into at least an intake flow FAL and an intake flow FAR. Many baffling arrangements are possible to divide and promote slow turbulent flow inside the bypass duct 14 in order to facilitate particle capture and retention, through controlled turbulence, fluid magnet contact, magnetic field concentration, and increased effective duct length. Referring to FIG. 2, divided bypass flows FAL and FAR flow past the plurality of magnets 26 inside bypass duct 14, forming at least an exhaust bypass lubricant flow FBL and an exhaust flow FBR. These flow out of filter 30 and back into the fall flow stream as an exhaust flow FB after leaving behind in the filter a substantial amount of magnetic particles attached to magnets 26, or other medium.

Now referring to FIG. 1, the bypass flow exits the filter 30 through exhaust control orifice 20. Also note that in this particular design, control orifices 18 and 20 are substantially diametrically opposed and at different planes. In addition, intake control orifice 18 is located adjacent to a zone of restricted or slow lubricant flow SF, and the exhaust control orifice 20 is located adjacent to a zone of fast lubricant flow FF. Still referring to FIG. 1, note that in the vicinity of intake control orifice 18, the full flow F runs into a strategically located occlusion OC, which creates a zone of low velocity next to orifice 18. Also note that exhaust orifice 20 is located in the vicinity of free flow FF. This situation enhances the presence of the pressure differential due to the plurality of full flow orifices 16, by creating a zone of slow and fast velocity flow to further enhance the total pressure differential available to effect the by-pass flow inside bypass duct 14. In addition, since the bypass positive pressure increases as the restriction, lubricant velocity, cylinder thickness, and frictional losses increase, it is desirable to have an adjustable ratio between the collective area of orifices 16 to the effective cross sectional flow area. In order to accommodate most engines flows, estimated at 3 to 4 gallons per minute, and to allow for even more differential pressure and filter media exposure, the height or thickness of filter 30 should be within a range of 0.375 to 3.5 inches.

Referring to FIG. 3, a normally provided spin on oil filter 46, having the filter intake plate 32 equipped with a set of spin on filter thread 50, attaches to an engine block 44 at a threaded engine oil filter point of attachment 36. The installation forms essentially a short length conduit of cross sectional area having a diameter SC1 to SC2, when a spin on oil filter gasket 52 mates against block 44. In order to provide a range of diameters that meet most installations, the filter body 30 diameter should be between a range of 1.5 to 4.5 inches. In fact, in most situations, an additional function is available for this device configuration, given that for most installations there is the possibility of utilizing limited radial clearance. Referring to FIG. 1, the filter body 30 is equipped with a set of cooling fins 58, which increase the effective cooling area and radiates heat from the slow bypass lubricant flow to the atmosphere, yielding another simultaneous beneficial function for the present invention.

One possible arrangement of magnets inside the bypass duct 14 is shown in FIG. 4, where the mean radius of the bypass duct 14, as shown in FIG. 3, is 1 5/16 inches. Magnets 26 in FIG.4 are 0.375 inch in diameter and 0.25 inch thick and FIG. 4 shows a possible arrangement of up to 35 magnets in a fully elongated mean effective circumference. Still referring to FIG. 4, it shows a sample of a partial arrangement of magnets 26 with 0.25 inch diameter and 0.25 inch thickness in which up to 96 magnets can be arranged within the fully elongated mean effective circumference. It is now clear and apparent to those skilled in the art, that this arrangement is for illustration purposes, and that multiple passes, magnetic field concentrators, flow baffles, perforated metals, rare earth magnets, filter media, could be placed inside the bypass duct 14, without the need of extensive external hardware.

Figure 5:
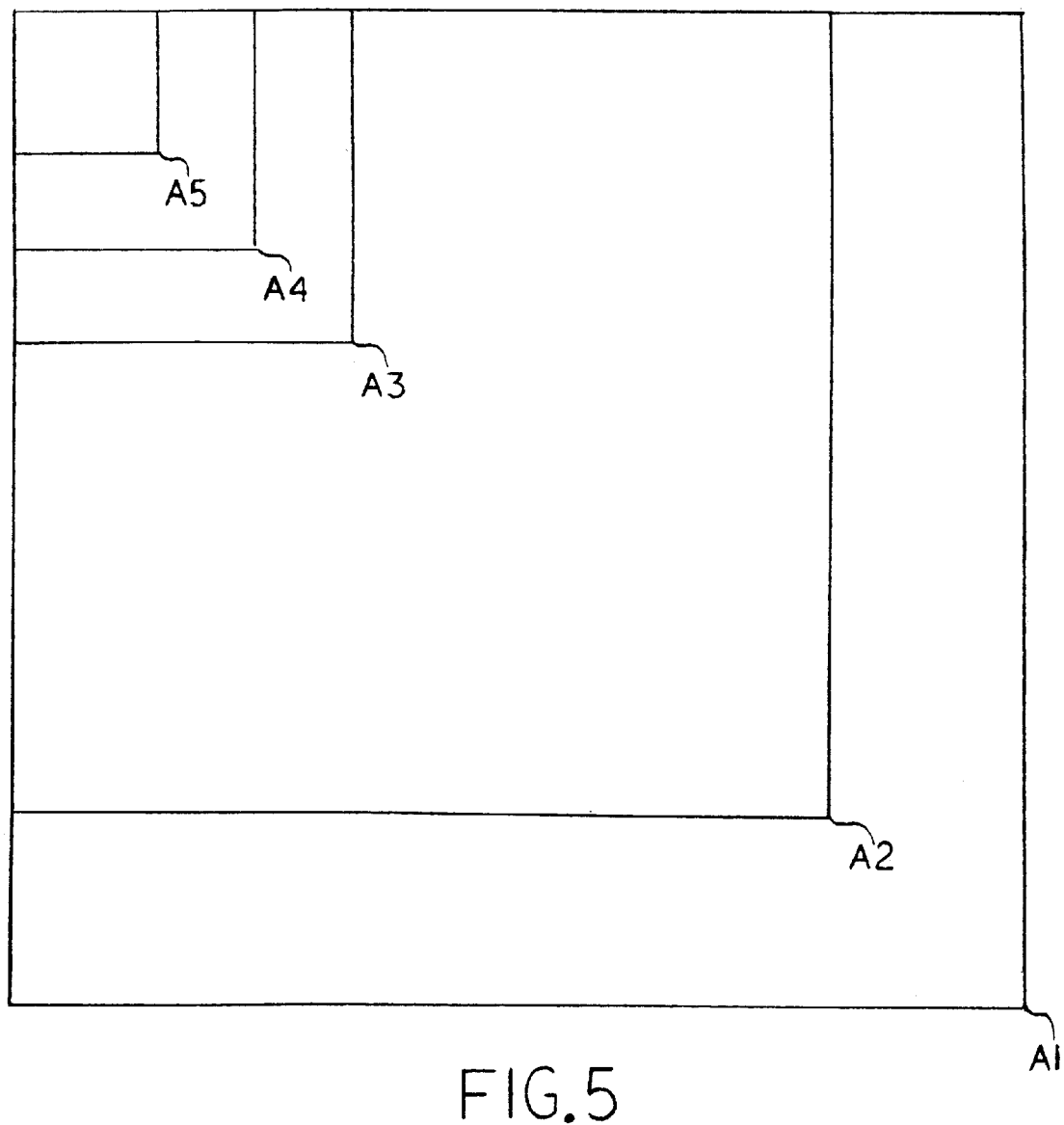
FIG. 5 illustrates a comparison of magnet surface area in direct contact with the bypass lubricating lubricant flow as a function of magnet radii and an included contact area of a popular commercially available externally attached apparatus as an example of prior art shortcomings.

Referring now to FIG. 5, it shows the effective magnet surface area in direct contact with the bypass lubricant flow for the example arrangements of FIG. 4. Still referring to FIG. 5, it shows an area A1 with an effective area of approximately 27.6 square inches using the 96 magnet arrangement. An area A2 shows an effective area of 16.6 square inches using the 35 magnet arrangement. An area A3 shows an effective estimated area of contact for a commercially available belt type canister arrangement at 3 square inches. However, due to field leakage and losses through the canister steel wall, the estimated 3 square inches may degrade in its effectiveness to a generous estimated area A4 of 1.6 square inches when compared to the same magnet in direct exposure to the lubricant flow. In fact area A3 is the estimated area of the commercially available belt type heavy-duty model equipped with four magnets. The light duty model of that commercial line, for passenger cars, is equipped with only two magnets at an estimated area A5 of only a non-adjusted 0.6 square inches contact surface. It is now apparent by observing FIG. 5, that the effectiveness of the present invention is superior in that fill utilization of the magnet surface is possible and without field leakage nor weakening. It yields up to an estimated factor of A2/A4=11 area ratio, the number of times additional surface area that is available for not only capturing, but retention of magnetic particles when compared to a similarly competing product patented in prior art. In addition, it could be argued that since the areas A1 and A2 are in full contact with the fluid without magnetic leakage nor weakening, the area aspect of 11 could be safely multiplied by a factor larger than unity. This fact is even more compelling if magnetic material is designed as field concentrators for these configurations. In fact, U.S. Pat. No. 5,556,540, issued Sept. 17, 1996 to Brunstig, discloses research related to the effect of such magnets attached to the outside wall of a canister. The magnetic field percentage found inside the canister was only 7% of the available magnet full strength. With this information, the available footprint area A3 in FIG. 5 can be effectively reduced due to Brunstig's research to a disappointing, yet generous, 0.3 square inches of full strength equivalency. Therefore the real area aspect ratio can be estimated as the quotient A2/(A3× 0.07)=80. It is now apparent that even if we miss our estimate by a factor of 2, the net effect of the present invention when compared to a patented commercially available product of similar cost is in the order of 40.

Now referring to FIG. 3, the bypass filter apparatus 30 is securely and quickly installed to the threaded engine oil filter point of attachment 36 by a nipple adapter 24. Nipple 24 couples directly to the engine oil filter point of attachment 36 and secures the body of the bypass filter apparatus 30 against the engine block 44. Still referring to FIG. 3, an engine block seal 28 is provided and interposed between the filter 30 and engine block 44 to prevent leakage of pressurized lubricant fluid. The nipple adapter 24 includes means for securing the filter 30 against the engine block 44. The nipple adapter 24 has means of securing connection of the normally provided spin on oil filter 46 through an oil filter intake plate 32 having the set of spin on filter threads 50 which mate with a set of insert external threads 54. Still referring to FIG. 3, the nipple adapter 24 is inserted into a filter apparatus central passage 42 of the filter apparatus and holds the filter 30 in proper alignment with the engine block 44 and the oil filter 32. The insert 24 has a set of internal threads 56 which mate with the filter point of attachment 36 securing mechanically and sealingly the complete installation on engine block 44.

It will be understood that each of the elements described above, or two or more together may also find some useful application in other type of methods differing from the type described above.

It thus will be seen that there are provided systems which achieve the various objects of the invention and which are well adapted to meet the conditions of practical use and welfare.

While certain novel features of this invention have been shown and described and will be pointed out in future claims, it is not intended to be limited to the details above, since it will be understood that various omissions, modifications, substitutions and changes in the forms and details of the device illustrated and in its operation can be made by those skilled in the art without departing in any way from the spirit and scope of the present invention.

I claim:

1. A method for removing and retaining suspended contaminant particles from an internal combustion engine lubricant flow, said engine having an oil pump pressure outlet, a normally installed spin on filter having an oil filter intake plate, said flow normally pressurized and flowing unrestricted from the pump pressure outlet toward the oil filter intake plate, wherein a conduit section is formed through their assembled combination, said conduit sealingly disposed between said pressure outlet and said filter intake plate, said method comprising the steps of:

a. providing a lubricant flow restriction means sealingly disposed between associated ends of said conduit section, said restriction having a plurality of predetermined full flow control orifices for fluidly connecting said oil pump pressure outlet and said oil filter intake plate;

b. placing said lubricant flow restriction means sandwiched between said oil pump pressure outlet and said oil filter intake plate for creating a positive pressure differential between the oil pump pressure outlet side and the oil filter intake plate side of said flow restriction means;

c. providing a duct within said lubricant flow restriction means;

d. providing at least a first predetermined inlet control orifice juxtaposed to said pump pressure outlet side for fluidly connecting said pressure outlet to the duct in step c;

e. providing at least a second predetermined exhaust control orifice juxtaposed to said oil filter intake plate side for fluidly connecting said oil filter intake plate to the duct in step c, and for fluidly connecting the inlet control orifice to the exhaust control orifice through the duct in step c;

f. providing a filter medium within the duct;

g. running said engine for establishing normal engine lubricant flow, urging a bypass lubricant flow through said duct, said bypass lubricant flow moving from said inlet orifice to said exhaust orifice;

whereby said bypass lubricant flow is substantially filtered during step g.

2. An internal combustion engine bypass filter apparatus, the engine having a normally provided oil pump pressure outlet, a normally provided spin on oil filter having an oil filter intake plate, a lubricating fluid, a threaded engine oil filter point of attachment, the bypass filter apparatus comprising:

- a substantially cylindrical body having a substantially unobstructed central passage open at each end, defining a first and a second substantially circular parallel sectional areas, and a central passage area;
- a plurality of orifices for fluidly connecting said first and second area;
- a substantially annular shaped sealed duct between said first and second parallel sectional areas having at least a first orifice for fluidly connecting said duct to said first area, and at least a second orifice for fluidly connecting said duct to said second area;
- a filter medium disposed inside said sealed duct; and
- an insert having a central passage for returning filtered oil from said spin on oil filter to the engine, said insert having a set of external threads to securely screw said spin on oil filter intake plate, a set of internal threads to securely screw the insert to the oil filter point of attachment, said insert fit into said central passage of the filter body for aligning and for sandwhiching the filter apparatus against said oil pump pressure outlet, whereby said insert helps to sealingly secure the filter body against the pump pressure outlet and against said spin on filter.

3. A filter apparatus as in claim 1, wherein at least a flow baffle is included inside said duct to increase turbulence, fluid magnet contact, magnetic concentration, and effective length of said duct.

4. A filter apparatus as in claim 2, wherein said cylindrical body has a height within the range of 0.375 inches to 3.5 inches.

5. A filter apparatus as in claim 2, wherein said substantially cylindrical body has a diameter within a range of 1.5 inches to 4.5 inches.

6. A filter apparatus as in claim 2, wherein said filter medium is magnetic.

7. A filter apparatus as in claim 2, wherein said filter medium is chemical.

8. A filter apparatus as in claim 2, wherein said filter medium is porous.

9. A filter apparatus as in claim 2, wherein the ratio of a first collective area of said full flow control orifices to a second area of one parallel surface is adjustable.

10. A filter apparatus as in claim 2, wherein said inlet control orifices and said exhaust control orifices are correspondingly positioned in a substantially diametrically opposed arrangement.

11. A filter apparatus as in claim 2, wherein the inlet control orifices and the exhaust control orifices are disposed in an area of slow and fast moving lubricant flow respectively.

12. A filter apparatus as in claim 2, wherein cooling fins are included on said filter body to provide cooling to said bypass flow.

* * * * *